United States Patent [19]

Enters et al.

[11] 4,062,408

[45] Dec. 13, 1977

[54] ROTARY TILLER TINE ASSEMBLY

[75] Inventors: Edward W. Enters, Fredonia; Tommy A. Middlesworth, Sheboygan, both of Wis.

[73] Assignee: Gilson Brothers Company, Plymouth, Wis.

[21] Appl. No.: 628,186

[22] Filed: Nov. 3, 1975

[51] Int. Cl.² ............................................. A01B 33/02
[52] U.S. Cl. ..................................... 172/123; 172/42; 172/253; 172/60; 172/772; 172/556
[58] Field of Search ................. 172/60, 123, 604, 249, 172/253, 548, 536, 540, 550, 177, 185, 568, 186, 42, 43

[56] References Cited

U.S. PATENT DOCUMENTS

| 323,343 | 7/1885 | Dow | 172/604 X |
|---|---|---|---|
| 1,046,921 | 12/1912 | White | 172/548 |
| 2,012,434 | 8/1935 | Pedersen | 172/548 |
| 2,406,553 | 8/1946 | Mader | 172/604 X |
| 2,515,268 | 7/1950 | Seaman | 172/548 X |
| 2,943,687 | 7/1960 | Merry et al. | 172/123 X |
| 3,203,487 | 8/1965 | Whitesides | 172/548 |
| 3,650,334 | 3/1972 | Hagenstad | 172/253 X |
| 3,669,193 | 6/1972 | Cooper et al. | 172/604 X |
| 3,734,197 | 5/1973 | Zehrung | 172/21 |

*Primary Examiner*—George J. Marlo

[57] ABSTRACT

A rotary tiller tine assembly in which a main shift has an end key and a shaft extension has at one end an end socket coupled to the main shaft key and at its other end a socket which receives a plug key with which outboard tines are interlockingly engaged.

18 Claims, 3 Drawing Figures

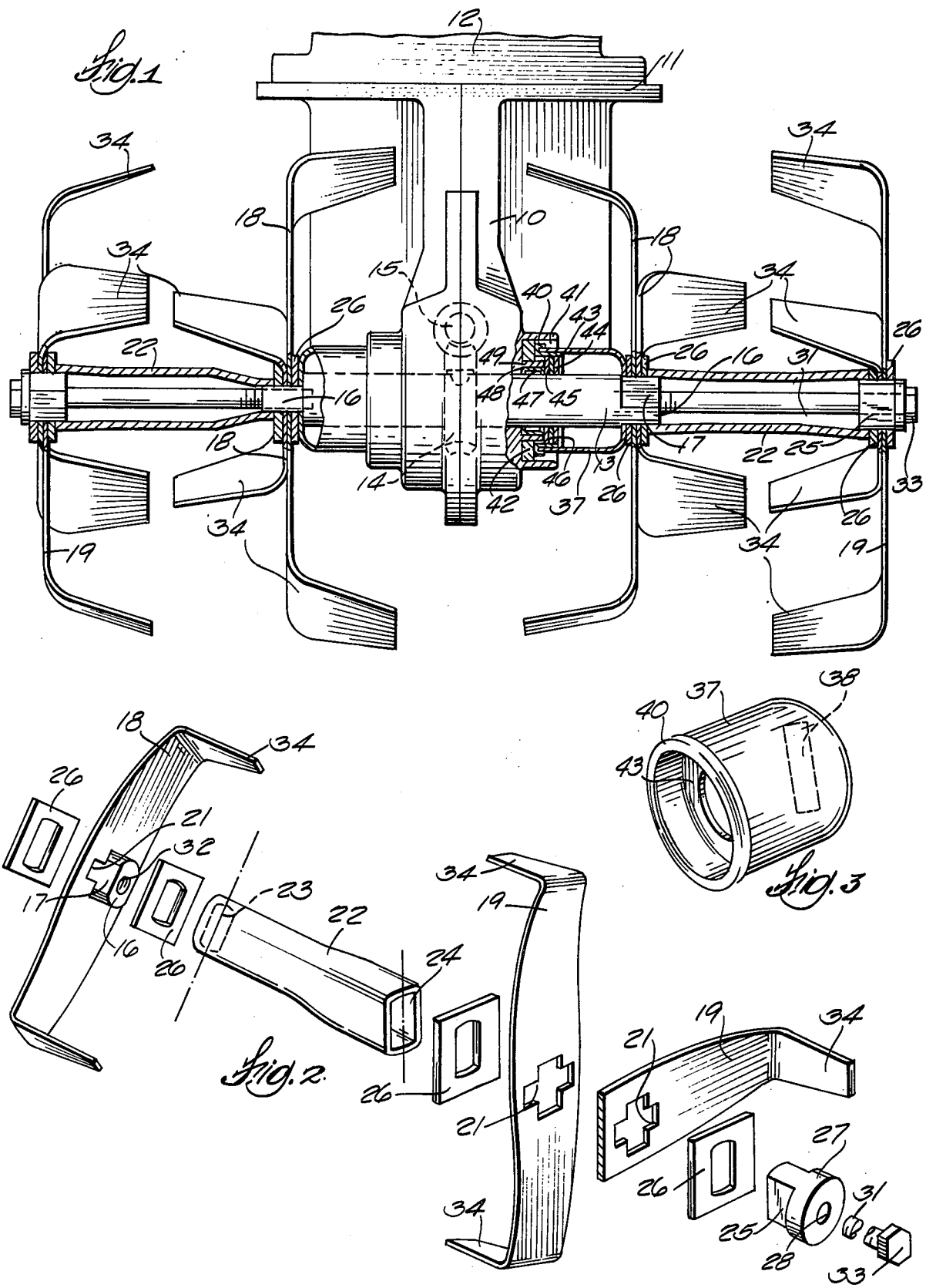

ROTARY TILLER TINE ASSEMBLY

SUMMARY OF THE INVENTION

The invention is characterized by the shaft extension structure on which outboard tines are removably mounted. Where a narrow tilling swathe is desired, only inboard tines are used. However, for a wider tilling swathe, outboard tines are added. These are carried by the shaft extension structure disclosed herein. The main shaft is provided at each end with an end key which interlocks with sockets formed in the inboard tines. The key also interlocks with a socket formed on one end of a shaft extension which has at its other end a socket which receives a plug key with which the outboard tines are interlockingly engaged. The shaft extension is desirably hollow to receive a coupling bolt which passes through the plug key, the shaft extension and into a tapped hole in the end of the main shaft, thus to assemble the parts. This arrangement facilitates assembly and disassembly and changing the tine arrangement. In preferred embodiments, the sockets in the opposite ends of the shaft extension are angularly displaced, thus to correspondingly displace the tines and smooth their impact with the ground.

Other objects, features, and advantages of the invention will appear from the disclosure hereof.

DESCRIPTION OF THE DRAWINGS

FIG. 1 is a cross section taken through a tine assembly embodying invention.

FIG. 2 is an exploded perspective view illustrating how the parts of the tine assembly are interrelated.

FIG. 3 is a perspective view of a seal collar.

DESCRIPTION OF THE PREFERRED EMBODIMENT

Although the disclosure hereof is detailed and exact to enable those skilled in the art to practice the invention, the physical embodiments herein disclosed merely exemplify the invention which may be embodied in other specific structure. The scope of the invention is defined in the claims appended hereto.

Like parts are given the same reference characters in the several views.

The rotary tiller may be of the type generally shown in U.S. Pat. Nos. 3,132,539; 2,903,077.

Details of the engine, wheels, etc., are not shown as they are not material to the present invention.

The tiller has a gear case 10 having flange 11 affixed to the engine frame 12. Gear case 10 supports a tine assembly which includes a main shaft 13 which carries a worm wheel 14 at its midpoint. The worm wheel 14 is engaged with a worm gear 15 for the purpose of transmitting power from the engine to the shaft 13.

At its opposite ends, the main shaft 13 is provided with keyed ends 16 having diametrically oppositely disposed flats 17. The ends 16 with flats 17 constitute a generally elongated key to which sets of inboard tines 18 are individually coupled. Each inboard tine 18 is provided with a cruciform socket 21, the arms of which are generally complementary to the elongated key 16 on the ends of main shaft 13. Tines 18 are desirably coupled to the key 16 at angularly displaced positions 90° apart.

The elongated key 16 and one end of main shaft 13 are desirably 45° angularly displaced from the key 16 at the other end of main shaft 13. Accordingly, the tines 18 at opposite ends of shaft 13 will impact or dig into the ground at 45° intervals for smooth delivery of tilling force to the ground.

The tiller can be used with only the inboard sets of tines 18, for tilling a narrow swathe. However, if a wider swathe is desired, main shaft 13 is extended axially by utilizing shaft extensions which desirably comprise hollow tubes 22. At one end, extension shaft tube 22 is provided with a rectangular socket 23 and at its other end it is provided with another rectangular socket 24 which is desirably twisted or angularly displaced by 45° from the orientation of socket 23.

Sets of outboard tines 19 with cruciform sockets 21 are mounted on the outer end of shank extension tubes 22 by means of plug keys or bushings 25 which are inserted through aligned tine sockets 21. Washers 26 are desirably disposed at opposite sides of the respective pairs of tines 18, 19.

Each plug key 25 has an enlarged circular head 27 and a through-bore 28. An elongated bolt 31 releasably connects the outboard set of tines 19, the shaft extension 22, plug keys 25 and washers 26 to the main shaft. The bolt 31 extends through the hollow shaft 22 and is threaded into a tapped opening 32 which is formed axially into the end of the main shaft 13. The bolt has a head 33 which engages head 27 on plug key 25. When bolt 31 is tightened, it will secure the inboard tines 18 and the outboard tines 19 to the main shaft 13, as shown in FIG. 1.

Washers 26 are clamped by bolt 31 between the head 27 of plug key 25 and outboard end of shaft extension 22, and between the inboard end of shaft extension 22 and main shaft 13. The respective ends of the main shaft 13 and shaft extension 22 and the inner face of plug 27 comprise shoulders seated against the sides of the washers 26. The washers 26 embrace hub portions of tines 18 and 19 to reenforce and support the tines. This makes it possible to utilize thinner gauge metal in the tines 18, 19 than would otherwise be required.

Each tine 18, 19 has its ends turned to form blades 34. The inboard sets of tines 18 which are directly mounted on the ends of main shaft 13 are typically oriented as shown in FIG. 1 in which the innermost tine has its blades 34 extending inwardly and the outermost tine has its blades 34 extending outwardly. The outboard paried sets of tines 19 may have the blades 34 of both tines facing inwardly, as shown in FIG. 1. However, the blades of one tine of each set can face inwardly and the other outwardly, as shown in FIG. 2, depending on circumstances. In this way the width of the area cultivated by the tiller can be varied.

The disclosed arrangement in which opposite ends of shaft 13 have their keys 16 angularly displaced or twisted through a 45° angle and the shaft extensions 22 have their socketed ends likewise angularly displaced 45° results in the blades 34 on the ends of the tines 18, 19 being displaced through 45° angles for successive impact on the earth.

Seal collar 37 is rotatably carried on shaft 13. Collar 37 comprises a cup having a bottom with a rectangular keyed hole or socket 38 which is engaged by flats 17 on the key 16 of the main shaft 13. Cup 37 has a rim 40 received in an annular groove 41 formed in the side of gear case 10. A felt washer 42 is disposed at the bottom of groove 41 and contacts cup rim 40.

Collar 37 has a nested cup portion 43 which holds two felt washers 44, 45 separated by a metal washer 46. The metal washer 46 allows for relative movement between the felt washers 44, 45. The seal collar 37 and associated parts protect the oil seal 47 which fits into another groove 48 formed in the gear case 10. The keyed engagement between the collar 37 and shaft 13 causes collar 37 and washers 44, 45, 46 to turn with respect to oil seal 47 and felt washer 42. Gear case 10 has an annular rib 49 between grooves 41, 48. The rib 49 engages felt washer 45 with light pressure.

Accordingly, the seal collar assembly functions as a labyrinth type seal to keep dirt and other foreign matter away from the oil seal 47.

What is claimed is

1. A rotary tiller tine assembly comprising a main shaft having an end, means on said end of said main shaft defining a key having diametrically opposite flats, a shaft extension having opposite ends, means defining generally rectangular socket portions at each of the opposite ends of said shaft extension, one socket portion engaged with said diametrically opposite flats of said key on said main shaft end, a plug member including means defining a key having diametrically opposite flats with said flats engaged in the other of said shaft extension ends, and an outboard tine including means defining surfaces therein generally complementary to and interlockingly engaged with said flats of said plug member key.

2. The assembly of claim 1 including an inboard tine having means thereon defining surfaces generally complementary to and interlockingly engaged with the flats of said main shaft key, and wherein the socket portions at opposite ends of said shaft extension are arcuately displaced through an angle for similarly arcuately displacing the tines at said ends.

3. The assembly of claim 2 wherein said shaft extension is hollow, wherein the end of said main shaft has a tapped opening, and including a bolt having a head bearing against said plug member and a shank extending through said hollow extension shaft and threaded into said tapped opening to releasably hold the assembly together.

4. The assembly of claim 1 in which said main shaft and plug member keys comprise generally rectangular axial projections from respective ones of said main shaft and plug member and the tine means defines a cruciform opening to provide said surfaces for selective angular engagement of said tine with said plug member key.

5. The assembly of claim 1 in which said assembly is mounted on a tiller gear case, including an oil seal between the gear case and main shaft and a seal collar protecting said oil seal from foreign matter, said seal collar including means defining surfaces generally complementary to and engaged with the flats of said main shaft key whereby the seal collar rotates with the main shaft.

6. The assembly of claim 5 in which said seal collar has a rim, said gear case includes means defining a groove and said seal collar rim is rotatably interfitted in said groove.

7. The assembly of claim 5 in which said seal collar carries a felt washer and said gear case has a rib which engages said felt washer.

8. In a rotary tiller tine assembly comprising a shaft and tines coupled thereto, the improvement in which the shaft includes means at an end thereof defining a key, said tines each have a hub comprising a flat strip and means in said flat strip defining a keyway complementary to and interlocked with said shaft key, flat washers disposed on opposite sides of the tine hub, said flat washers also including means defining keyways complementary to and interlocked with the shaft key, and clamp means clamping the washers against the tine hub whereby the washers re-enforce the tine hub.

9. The assembly of claim 8 in which said clamp means comprises shaft shoulders at opposite sides of the assembled tine hub and washers and a bolt for urging the shoulders against the washers.

10. The assembly of claim 9 in which said shaft comprises separate shaft sections held together in axial alignment by said bolt, said separate shaft sections each having said shoulders.

11. In a rotary tiller tine assembly comprising a shaft and tines coupled thereto, the improvement in which the shaft comprises a main shaft section and an extension shaft section, said main shaft section having an end and means on said main shaft and defining a key having diametrically opposite flats, said extension shaft section comprising a hollow tube and including means defining a generally rectangular socket portion at one end of said tube and interlocked with the main shaft key, and elongated coupling member extending through the hollow tube, and attaching means interconnecting the opposite ends of the coupling member to the main shaft and to the end of the hollow tube.

12. The assembly of claim 11 in which the hollow tube includes means at its other end defining a generally rectangular socket portion, said attaching means includes a hollow plug engaged in the last-mentioned socket portion, said elongated coupling member comprises a bolt extending through said hollow plug and having a head engaged with said plug.

13. The assembly of claim 12 in which the main shaft has a tapped opening into which the bolt is threaded.

14. The assembly of claim 11 in which the hollow tube includes means at its other end defining a generally rectangular socket portion, the socket portions at the opposite ends of the tube being angularly displaced.

15. The assembly of claim 11 in which the tines have flat strip hub portions and means in said hub portions defining sockets having a shape complementary to and interlocked with the key at the end of the main shaft, such a tine being disposed between the main shaft and the extension shaft and interlocked with said key, said main shaft and extension shaft having end shoulders embracing the tine hub.

16. The assembly of claim 15 in which flat washers are interposed between the said shoulders and the tine hubs to re-enforce said hubs.

17. The assembly of claim 15 in which the hollow tube includes means at its other end defining a generally rectangular socket, said attaching means comprises a plug member including means defining a key having diametrically opposite flats engaged in the last-mentioned socket, such a tine being disposed between the extension shaft and the plug member and interlocked with the plug key, said extension shaft and plug member having end shoulders embracing the tine hub.

18. A rotary tiller assembly comprising a main shaft, an elongated shaft extension in axial alignment with and extending from said main shaft, said main shaft and said shaft extension arranged generally end to end, means defining diametrically opposite flats on the end of said shaft adjacent said shaft extension, means on the end said shaft extension adjacent said shaft defining a socket generally complementary to said main shaft end and said socket interlocked with said flats so that said extension rotates with said shaft, a tine disposed at said end of said shaft and including means defining surfaces in said tine generally complementary to and interlocked with said flats on said shaft so that said tine rotates with said shaft, and means for releasably clamping said shaft, shaft extension and tine together.

* * * * *